United States Patent Office 3,597,161
Patented Aug. 3, 1971

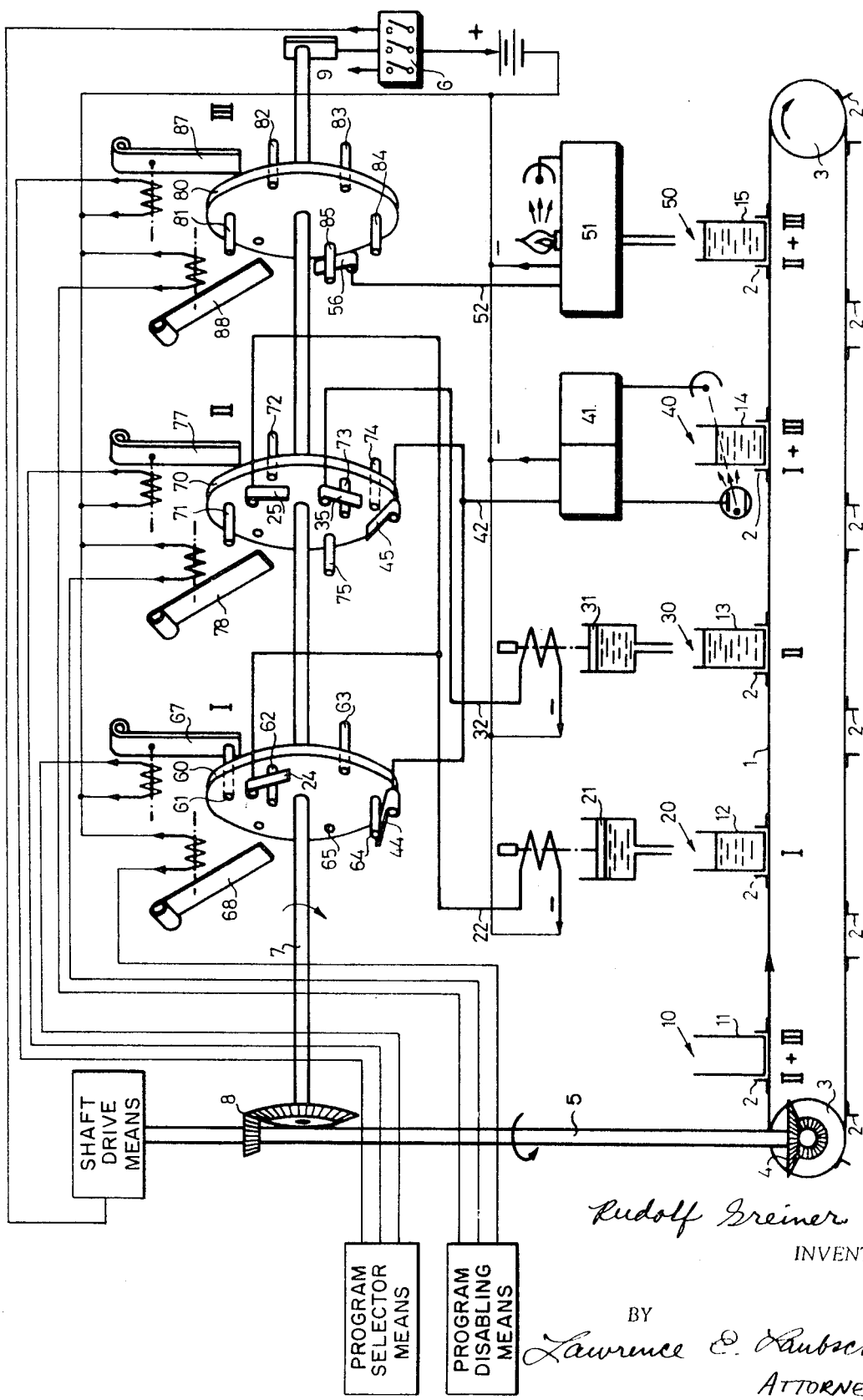

3,597,161
SAMPLE ANALYZING APPARATUS
Rudolf Greiner, Langenthal, Switzerland, assignor to Greiner Electronic AG, Langenthal, Switzerland
Filed Aug. 11, 1969, Ser. No. 848,852
Claims priority, application Switzerland, Dec. 18, 1968, 18,853/68
Int. Cl. G01n 1/00, 1/10
U.S. Cl. 23—253R
10 Claims

ABSTRACT OF THE DISCLOSURE

Apparatus for chemically and/or physically analyzing a sample of a given material, such as a liquid, contained in a receptacle, characterized by the provision of a series of analyzing stations each including normally de-energized electrically operable analyzing means, conveyor means for transporting said receptacle in succession past said stations, respectively, and program establishing means for energizing predetermined ones of said analyzing means during the transport of the receptacle thereby in accordance with a given analyzing program. The program establishing means includes a memory device operable in synchronism with the conveyor means, program input means for storing command instructions in said memory device in accordance with the desired analyzing steps of said program, detector means for sensing the command instructions, and circuit means responsive to the detected command signals for operating the selected analyzing means. In the preferred embodiment, the memory means includes a rotor disk that carries operating pin means that are axially shiftable between passive and active positions relative to said detector means.

---

When carrying out a chemical and/or physical analysis, the sample to be analyzed is commonly placed into a container or receptacle and thereafter treated and examined in accordance with a predetermined analytical program. For the purpose of rendering it possible to execute a series of analyzing steps, a conveying system has been provided by means of which the receptacles containing the samples are successively transported by the individual stations. Disposed at these stations are analyzing means that carry out the treatments and/or observations corresponding to the analytical program. At each of these stations, the same treatment or observation of the samples is repeated automatically as soon as a previously treated or examined sample has been discharged and a subsequent sample has taken its place. Depending upon the analytical program that is to be carried out, the analyzing means disposed at the various stations consists of pipette means, stirring means, irradiating means, and dispensing means, together with various observing or testing devices and the like.

In the known apparatus for carrying out such analyses in series, only a single analytical program is generally used as a basis for the system, and the stations present along the conveying or feeding means are accordingly provided with permanently installed apparatus. On the other hand, it has been proposed in the art to provide exchangeable or replaceable analyzing means at the various stations, whereby the system can be adapted to perform different analytical programs. Since, however, each change in the equipment of the stations requires a certain amount of time, such is justifiable only if a relative large batch of samples is to be tested according to the altered analytical program.

When numerous examinations or investigations are carried out in series, however, it oftentimes becomes necessary that one be able to immediately change from sample to sample the analytical program being employed (for example, when, in addition to the investigation proper, standard values, comparative values or empty values of the solvents or reagents that have been employed must be determined in a periodic sequence either initially or subsequently). It may also become necessary to temporarily interrupt an examination of a larger batch of samples which has already been begun in order to carry out, for instance, an urgent order that requires a different analytical program. In order to meet these and similar operational requirements, a plurality of synchronously-operated devices has been provided, each of which is to carry out only a single one of the analytical programs which are respectively envisaged. Installations having this type of construction (which generally comprise also a central control unit for actuating the various devices in a timed manner) are, however, disproportionately expensive and bulky if they have to be designed for a greater number of different analytical programs.

The present invention relates to an improved system for carrying out, in series, a plurality of chemical and/or physical analyses wherein, with the aid of one or more conveyor means, containers for receiving the samples to be analyzed are transported by individual stations provided with normally deactivated apparatus for treating and/or checking the samples. A change in the analytical program from sample to sample can be effected at once, in accordance with the present invention, in that all of the stations needed for a plurality of different analytical programs are disposed in tandem along the feeding device and/or devices. In accordance with an important feature of the invention, memory means are provided which are driven synchronously with the conveyor means and defines for each of the previously established analytical programs a memory arrangement that corresponds with the respective analytical program.

A more specific object of the invention is to provide input means for storing in the memory means command instructions that correspond with the selected analytical program, each of the set control commands being coordinated to one or to a group of the containers. Detector means for sensing the control commands are disposed adjacent the memory means in correspondence with the arrangement in which the stations encompassed by the respective analytical program extend along the conveyor means. Circuit means are disposed between the detector means and the corresponding stations for actuating the various analyzing means in accordance with the control commands being received by the detector means.

Other objects and advantages of the invention will become apparent from a study of the following specification when viewed in the light of the accompanying single figure of drawing, which is a schematic electrical diagram of the analyzing system.

The device illustrated in the drawing comprises an endless conveyor 1 which is provided at uniformly spaced intervals with outwardly-pointing holders or supports 2 that are equipped to receive the sample containers 11 to 15. The inner surface of the conveyor belt 1 is preferably equipped with tooth means (not shown) which engage corresponding tooth means (also not shown) on one of the conveyor rollers 3. The driving conveyor roll 3 is further coupled via a gearing 4 with the drive shaft 5 that is driven by drive means controlled by a cyclically-operating pulse generator 6. The drive means are so operable that during each pulse, the conveyor belt 1 is stepped to the right a given increment, whereupon the conveyor 1 subsequently remains in a position of rest for a predetermined period of time during the treating and testing of the samples. The entire device is moreover so dimensioned that, after the execution of one feeding step, any desired container will arrive at precisely the same spot that the preceding container had assumed on the conveyor belt 1 before the conveying step was taken.

All of the stations 10, 20, 30, 40, 50 required for a given number of different analytical programs are arranged in tandem along the conveyor belt 1 so that each of the containers 11 to 15 is transported by all of the stations. The distances or intervals between successive stations are either directly equal to the path which each of the containers covers during one feeding step, or if desired, they may also amount to an integral multiple of the afore-mentioned path. It has been assumed in the drawing that at the first station 10 the containers are merely inserted into the supports or holders 2 of the conveyor belt 1, as has been indicated for the container 11. This insertion of the containers may be accomplished either manually or with the aid of automatic means which, in the latter case, is preferably controlled from, and by means of, the pulse generator 6. Disposed at the second station 20 is an electromechanically-actuated pipette 21 by means of which there is added to the sample a measured quantity of a solvent. It has been assumed in this case that all of the operations to be carried out by the pipette 21 takes place automatically in each case if a conductor associated with the station 20 receives a positive voltage. A similar automatically-operating pipette 31 is disposed at the third station 30 and is energizable to deliver a measured quantity of a reagent as soon as a positive voltage is applied to the corresponding conductor 32. The fourth station 40 is equipped with a photoelectric photometer 41 for analyzing the sample contained in the receptacle 14. A further test of the content of a sample may finally take place in the station 50 which is equipped with a flame photometer having a construction known per se. The flame photometer is indicated only schematically in the drawing and has been identified with reference numeral 51. In the manner outlined hereinabove, however, the photometers 41 and 51, respectively, are operable to initiate automatic operation only if and after the control lines 42 and 52 associated with the stations 40 and 50, respectively, have received the required positive voltage.

In the device illustrated, three different analytical programs may be obtained through the use of memory means including three storage rotors 60, 70 and 80, respectively, each of which is associated with one of the analytical programs. The afore-mentioned storage rotors are secured to a common shaft 7 which is rotated in a step-by-step manner by the shaft 5 via the gear means 8. Each of the storage paths is equipped moreover, with a plurality of operating members in the form of contact pins uniformly distributed in the circumferential direction, which pins are axially shiftable in a direction parallel with shaft 7 between active and passive positions. It has been assumed here that the contact pins 61, 71, 81 correspond with the container 11 being present at the station 10, and an analogous coordination or operative engagement has been assumed for the contact pins 62, 72, 82 relative to the container 12 at station 20, for the contact pins 63, 73, 83 to the container 13 at station 30, for the contact pins 64, 74, 84 to the container 14 at station 40, and for the contact pins 65, 75, 85 to the container 15 at station 50. For the purpose of displacing the contact pins to the left toward the active position relative to their rotor disks 60, 70, 80, respectively, program selector means are provided that include three individually excitable electromechanical relays 67, 77, 87 associated with the storage disks 60, 70, 80, respectively. These relays are mounted in such a manner that the relay armature thereof shifts the adjacent contact pin from the passive position to the activated position as soon as the respective relay is excited. In the drawing it has been assumed that the relay 67 has not been energized, and consequently the contact pin 61 has remained in the passive or retracted position. Conversely, the relays 77 and 87 have been energized and the contact pins 71 and 81 have been displaced into the activated position (i.e., wherein they project toward the left). the aforementioned contact pins remain in the activated position until—upon the completion of the corresponding analytical program—they pass into the zone of an erasing or disabling device by means of which the pins are shifted to the right to the passive position. As shown in the drawing, the erasing device comprises three normally de-energized relays 68, 78, 88.

For the purpose of sensing the control commands defined by the respective axial positions of the afore-mentioned contact pins, detector means 24, 44, and 25, 35, 45, and 56, respectively, are provided in the form of contact fingers disposed in the space to the left of each storage disk 60, 70 and 80, respectively. The conductive fingers are arranged in such a manner that they will enter into electrical engagement with the contact pins only if the respective contact pins are in the active (i.e., left hand) position (for example, as shown for the case of the contact pins 62, 64, 73, 85). As viewed in the direction of rotation of the storage disks 60, 70, 80, the contact fingers define an arrangement which corresponds to the arrangement in which the stations 20, 30, 40, 50 are to be operated during the predetermined analytical programs. Furthermore, the contact fingers are connected with the control lines 22, 32, 42, 52 of the corresponding stations in the manner shown so that the analyzing means at the respective stations will be energized in accordance with the control commands sensed by the contact fingers. It has further been assumed in the drawing that the contact pins are electrically connnected with the pulse generator 6 via the rotor disks 60, 70, and 80, shaft 7, and conductive brush 9.

The detector means 24 and 44 define a first program I during which only the analyzing means of stations 20 and 40 are energized, since the aforementioned contact means are connected only with the corresponding control lines 22 and 42, respectively. According to this program I, a solution having a predetermined concentration is produced from a sample by means of the pipette 21, and the dispersion thereof is thereupon measured by means of the photometer 41. The program I is thus an analytical program such as is frequently used for determining standard values, comparative values or empty values.

The detector means 25, 35, 45, on the other hand, define a program II which requires analyzing means at the stations 20, 30 and 40, because the detector means 25, 35, 45 are connected with the control lines 22, 32, 42. According to this program II, a reagent is added at station 30 to the sample being decanted in station 20. The chemical reaction resulting therefrom is subsequently examined photoelectrically at station 40. This program thus is an analytical program which serves primarily for observing or investigating chemical reactions of any kind.

As is readily evident, the programs I and II are independent programs since they are directed to an encompass both a treatment of the sample from physical chemical points of view, respectively, and presents an inspection or test of the results obtained thereby. It is by no means necessary, however, to restrict the device proposed by the present invention only to the pre-selection of independent programs. Rather, the device disclosed herein is very well suitable for handling and carrying out dependent partial programs which become meaningful only with the simultaneous use of one or several other programs. The single pick-up means 56, for example, which is in operative connection with the contact pins of the storage disk 80, defines such a dependent partial program. This program III consists merely in that the flame photometer 51 is employed as an optional expedient. Accordingly, the program III is a partial program which may be added, if necessary, to the aforementioned independent programs I and II, for instance in order to render possible more refined or improved testing.

When now considering the control commands having been already set in the storage disks 60, 70, 80 in accordance with the corresponding containers 11 to 15 being present on the conveyor belt 1, the execution of the programs II and III is initially predetermined for the future content of the container 11. This results from the fact that the contact pins 17 and 81 associated with the container 11 have been brought into the activated position. Furthermore, from those contact pins 62, 72, 82 associated with the container 12, only the contact pin 62 is in the activated position so that the program I will be carried out as a result. From among the next-following group of contact pins 63, 73, 83 merely the contact pin 73 is in the activated position so that the program II will be employed for the content of the container 13. From among the next contact pins coordinated to the container 14, the contact pins 64 and 84 are each in the activated position, which means the combined execution of the programs II and III. Finally, the content of the container 15 has already passed through all the phases of the combined programs II and III, as is evident from the activated position of the respectively coordinated contact pins 75 and 85. For the purpose of presenting these correlations more clearly, the programs to be respectively employed have been marked with Roman reference numerals below the containers, and attention is directed to the corresponding numbering of the storage disks.

By virtue of the device disclosed herein it is thus possible to select for each sample the desired analytical program from the set of programs afforded by the apparatus merely by correspondingly actuating the relays 67, 77, 87 defining the storage input, and this may be accomplished without any interruption in a continuous manner. The economical benefits and advantages of such a device from the point of view of operating techniques are readily apparent, particularly for relatively large installations. It is quite possible, for example, to store twenty to thirty different analytical programs, to cause the samples to pass through forty to fifty stations and to employ up to approximately ninety feeding steps.

The device illustrated in the drawing is further susceptible to modification in various ways without departing from the operating principles thereof. More particularly, it is obvious that the stations to be traversed extend along several consecutive feeding devices. In this case, the containers holding the samples may be directly transferred from one feeding device to the next succeeding feeding device. It is also possible, however, to equip each of the feeding devices with containers associated solely with a specific one of such feeding device and to merely decant the samples during the transfer thereof from one feeding device to the next. Furthermore, the adjusting members constituting one set each on the storage rotors 60, 70, 80 (such as, for example, the operating members 61, 71, 81) may be associated with a group of containers rather than only to a single container 10. The containers of such a group may be arranged side by side on the conveyor belt 1 in a direction extending at right angle to the feeding direction thereof. The analyzing means at the stations must, of course, be adapted accordingly. Also possible, however, is a construction in which the containers of one group of containers are disposed in tandem, viewed in the feeding direction of the conveyor belt 1. In that case, the distances between successive containers of the group are preferably equal to the feeding path which the conveyor belt 1 covers in the course of one feeding stop. If the group consists, for example, of three containers disposed in this manner, the storage rotors 60, 70, 80 must obviously be caused to execute one switching step for every third feeding step of the conveyor belt 1.

What is claimed is:
1. Apparatus for analyzing a sample contained in a container, comprising
  (a) a series of analyzing stations each including normally deenergized electrically-operable analyzing means, respectively;
  (b) conveyor means for conveying the container in succession past said analyzing stations;
  (c) program means for energizing predetermined ones of said analyzing means during transport of said container past the stations in accordance with a first analyzing program, including
    (1) memory means operable in synchronism with said conveyor means;
    (2) program input means for storing in said memory means a plurality of command instructions controlling the respective stations in accordance with the desired steps of said first analyzing program;
    (3) detector means associated with said analyzing stations, respectively for sensing the corresponding command instructions stored in said memory means; and
    (4) normally de-activated circuit means operable by said detector means in response to said command instructions for energizing said predetermined ones of said analyzing means, respectively; and
  (d) program erase means for erasing from the memory means the command instructions of said first analyzing program, thereby to permit insertion of a second analyzing program in said memory means by said program input means.

2. Apparatus as defined in claim 1, wherein said memory means includes at least one rotor driven in synchronism with said conveyor means, and a plurality of operating members each connected with said rotor for movement between passive and active positions, respectively, relative to said detector means; said program input means being operable to move at least a selected one of said operating members from the passive to the active position for detection by said detector means.

3. Apparatus as defined in claim 2, wherein said detector means comprises a plurality of normally deactivated detector contacts arranged adjacent said rotor for activation by those operating members that are in the active position.

4. Apparatus as defined in claim 3, wherein said detector contacts comprise normally-open conductive contacts electrically connected with said circuit means, respectively.

5. Apparatus as defined in claim 2, wherein said memory means includes a plurality of synchronously driven rotors each provided with at least one of said operating members, respectively; and further wherein said program input means includes a plurality of separate normally de-energized relay means each associated with one of said rotors, respectively, and operable to displace selected operating members thereof from the passive to the active positions, respectively, in accordance with a given analyzing program.

6. Apparatus as defined in claim 2, wherein said memory means includes a plurality of rotors secured in axially spaced relation to a common shaft.

7. Apparatus as defined in claim 6, wherein said rotors comprise a plurality of parallel disks secured to said shaft, respectively, and further wherein said operating members comprise a plurality of pins parallel with said shaft and slidably mounted in openings contained in each of said rotor disks, respectively, said pins being axially displaceable between said active and passive positions, respectively, relative to said disks and said detector means.

8. Apparatus as defined in claim 7, wherein said shaft, said rotor disks and said pins are electrically conductive and define a part of said circuit means for energizing said analyzing means.

9. Apparatus as defined in claim 1, wherein at least one of said analyzing means includes electrically operable pipette means for adding a given quantity of analyzing liquid to said container.

10. Apparatus as defined in claim 9, wherein one of said analyzing means includes photometer means responsive to the conductivity of light through said sample.

References Cited
UNITED STATES PATENTS

| | | | |
|---|---|---|---|
| 3,193,358 | 7/1965 | Baruch | 23—253 |
| 3,219,416 | 11/1965 | Natelson | 23—259X |
| 3,432,271 | 3/1969 | Wasilewski | 23—253 |
| 3,453,082 | 7/1969 | Natelson | 23—253 |
| 3,504,376 | 3/1970 | Bednar et al. | 23—230 |
| 3,508,879 | 4/1970 | Findl et al. | 28—259 |

MORRIS O. WOLK, Primary Examiner

R. E. SERWIN, Assistant Examiner

U.S. Cl. X.R.

23—230R, 259